(12) United States Patent
Rakotovao Andriamahefa

(10) Patent No.: US 12,227,191 B2
(45) Date of Patent: Feb. 18, 2025

(54) ITERATIVE METHOD FOR ESTIMATING THE MOVEMENT OF A MATERIAL BODY BY GENERATING A FILTERED MOVEMENT GRID

(71) Applicant: COMMISSARIAT A L'ENERGIE ATOMIQUE ET AUX ENERGIES ALTERNATIVES, Paris (FR)

(72) Inventor: Tiana Rakotovao Andriamahefa, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 353 days.

(21) Appl. No.: 17/531,483

(22) Filed: Nov. 19, 2021

(65) Prior Publication Data
US 2022/0185294 A1    Jun. 16, 2022

(30) Foreign Application Priority Data
Nov. 20, 2020    (FR) ...................................... 2011937

(51) Int. Cl.
*B60W 40/08*    (2012.01)
*B60W 60/00*    (2020.01)
*G06F 18/2415*    (2023.01)

(52) U.S. Cl.
CPC .......... *B60W 40/08* (2013.01); *B60W 60/001* (2020.02); *G06F 18/2415* (2023.01);
(Continued)

(58) Field of Classification Search
CPC ........................... B60W 40/08; B60W 60/001
See application file for complete search history.

(56) References Cited

U.S. PATENT DOCUMENTS

2012/0053755 A1\*    3/2012    Takagi .................. G01S 7/4808
                                                                                 701/1
2018/0231650 A1\*    8/2018    Heitzmann ............. G01S 13/86
(Continued)

FOREIGN PATENT DOCUMENTS

FR    2 890 773 A1    3/2007
FR    3 041 451 A1    3/2017
FR    3 065 133 A1    10/2018

OTHER PUBLICATIONS

Yu, et al., "Probabilistic Path Planning for Cooperative Target Tracking Using Aerial and Ground Vehicles", Proceedings of the 2011 American Control Conference, Jun. 29, 2011.
(Continued)

*Primary Examiner* — Jess Whittington
(74) *Attorney, Agent, or Firm* — BakerHostetler

(57) ABSTRACT

The invention relates to an iterative method for estimating the movement of at least one material body in a surrounding space discretized into a grid of cells that includes: a) obtaining an inconsistency grid in iteration t, generated in response to detection of a change of occupancy state in at least one of the cells of the grid of cells between an iteration t-1 and iteration t, b) recurrently generating a filtered movement grid in iteration t, the filtered movement grid in iteration t being generated on the basis of the filtered movement grid in iteration t-1 of an inconsistency grid from iteration t-1 and of the inconsistency grid in iteration t.

17 Claims, 11 Drawing Sheets

(52) U.S. Cl.
CPC ............... *B60W 2040/0881* (2013.01); *B60W 2420/403* (2013.01)

(56) References Cited

U.S. PATENT DOCUMENTS

| | | | |
|---|---|---|---|
| 2018/0247216 A1* | 8/2018 | Mottin | G06N 7/01 |
| 2019/0049239 A1* | 2/2019 | Natroshvili | G01N 15/10 |
| 2019/0049580 A1* | 2/2019 | Natroshvili | G01S 17/89 |
| 2020/0103523 A1* | 4/2020 | Liu | G01S 13/87 |
| 2020/0257931 A1 | 8/2020 | Yershov et al. | |
| 2020/0326721 A1* | 10/2020 | Buerkle | G06T 7/70 |
| 2021/0131823 A1* | 5/2021 | Giorgio | G01S 17/931 |
| 2022/0414151 A1* | 12/2022 | Steyer | G06V 20/56 |

OTHER PUBLICATIONS

Moravec, et al., "High resolution maps from wide angle sonar", Proceedings, IEEE ICRA, vol. 2, pp. 116-121, Mar. 1985.

Nuss, et al., "A random finite set approach for dynamic occupancy grid maps with real-time application", The International Journal of Robotics Research, 37(8), pp. 841-866, 2018.

Vu, et al., "Online Localization and Mapping with Moving Object Tracking in Dynamic Outdoor Environments", 2007 IEEE Intelligent Vehicles Symposium, Jun. 2007.

* cited by examiner

ITERATIVE METHOD FOR ESTIMATING THE MOVEMENT OF A MATERIAL BODY BY GENERATING A FILTERED MOVEMENT GRID

CROSS-REFERENCE TO RELATED APPLICATIONS

This application claims priority to foreign French patent application No. FR 2011937, filed on Nov. 20, 2020, the disclosure of which is incorporated by reference in its entirety.

FIELD OF THE INVENTION

The invention relates to a method for estimating the movement of a material body moving in the environment of an autonomous device (also called robot hereinafter) using distance sensors. It also relates to a device for implementing such a method.

BACKGROUND

The invention may be applied to any type of robot, for example terrestrial robots (autonomous cars), aerial robots (drones), underwater robots, etc.

A mobile robot navigates in space in order to perform a task. To navigate autonomously, the robot has to acquire knowledge about its environment in order to plan a path, avoid collisions and navigate in complete safety. The robot uses a perception system for this purpose.

The perception system retrieves data about the environment using measurements from on-board sensors. A computer-based model of the environment is then constructed and updated continuously by the perception system based on sensor measurements. The robot will perform reasoning and make navigation decisions based on the environment model.

Multiple types of environment model exist in the prior art. One of the ones most commonly used in robotics is the occupancy grid, initially introduced in the article by H. P. Moravec and A. Elfes "High resolution maps from wide angle sonar", Proceedings. IEEE ICRA, volume 2, pages 116-121, March 1985. The occupancy grid is a grid of probabilities: each cell has a probability of being occupied, therefore a value of between 0 and 1.

An occupancy grid is a map of a defined region of the environment surrounding the robot. The region is subdivided into multiple adjacent subregions, called cells.

A cell may have three dimensions (3D), for example a 10 cm×10 cm×10 cm cube. It may also be two-dimensional (2D), for example the space defined by a 10 cm×10 cm square. The collection of all of the cells forms a grid.

A cell is characterized by a value of between 0 and 1, representing the probability of the cell being occupied (reference is made to occupancy probability). The feature grid is obtained by thresholding the occupancy grid, as described in patent application FR3041451. A feature grid is therefore a Boolean grid: each cell is "TRUE" if its occupancy probability exceeds a certain threshold.

Occupancy grids have advantageous properties for a perception system. They constitute a robust method for fusing multiple sensors using different technologies. Patent application FR3041451 provides one example of a multi-sensor fusion method implementing integer arithmetic computations.

Commonly used detection technologies are lidars, radars, cameras and sonars. Although cameras give detailed textures and colors, they are limited in darkness. Lidars are able to give a detailed depiction of points clouds, but their performance decreases in poor weather (snow, fog or rain).

In this respect, multi-sensor fusion is essential for overcoming the limitation of a given technology. Occupancy grids also make it possible to manage measurement uncertainties and noise caused by probabilistic approaches.

Feature grids thus represent free space and the space occupied by one or more material bodies. "Material bodies" (or obstacle) is the name given to any substance or material object exhibiting uniqueness and able to be detected and identified by an appropriate sensor.

Inanimate objects, whether natural or artificial, plants, animals, human beings, but also liquid or solid particles suspended in air, such as clouds, or even liquid or gaseous masses, are thus considered to be material bodies.

For example, for an autonomous car, common material bodies are pedestrians, other cars, buildings, vegetation, cyclists, etc. The material bodies may be mobile, that is to say dynamic, or static. The movement of the material bodies may vary over time. For example, a pedestrian may stand up without moving for a brief period, and then walk in one direction.

The movement of material bodies may also be difficult to predict. For example, a pedestrian who is walking may suddenly change direction for an unknown reason.

Although feature grids provide an estimate of the location of material bodies, they are lacking a model of their movements. Specifically, estimating the movement of material bodies is essential in order to be able to track the evolution of the material bodies over time, predict their positions in the near future, predict potential collisions and adjust the path plan of an ego robot accordingly.

Much work has been carried out in the prior art in order to extend feature grids so as to estimate the movement of material bodies. Mobile material bodies modify the occupancy state of cells over time.

To estimate their movement, the commonly used approach consists in developing various algorithms for tracking the evolution of the locations of the occupied cells over time. Although these solutions give promising results, implementing them on on-board processing units—where integration constraints such as low cost, low energy consumption and real-time processing have to be met—remains a challenge due to a high demand for computing power.

In the solutions present in the prior art, there are two types of approach, called independent cell tracking and dynamic cell detection here.

In the first independent cell tracking approach, in addition to estimating the occupancy state of each cell, a probabilistic speed distribution for a cell is also estimated. The speed distribution estimates the probable speed vectors of each cell.

This approach was initially introduced by the Bayesian Occupancy Filter algorithm in patent application FR2890773. The Bayesian Occupancy Filter estimates the occupancy of each cell and also computes a distribution over a constant number of possible speed vectors.

Although the Bayesian Occupancy Filter makes it possible to estimate speed, its implementation is characterized by a high computing load and a high memory consumption, impairing its integration into an on-board processing unit. The Bayesian Occupancy Filter needs a dedicated high-specification graphical map to operate in real time, this not being compatible with integration into robots intended for the consumer market.

To reduce the computational complexity of the Bayesian Occupancy Filter, various algorithms based on particle filters have been developed, for example the one described in the article by Nuss, D., Reuter, S., Thom, M., Yuan, T., Krehl, G., Maile, M., Dietmayer, K. (2018) "A random finite set approach for dynamic occupancy grid maps with real-time application", The International Journal of Robotics Research, 37(8), 841-866. The definition of a particle in these algorithms may differ but, in general, the particles are a set of points distributed in space. The particles have position coordinates and a speed vector.

A particle also has a weight that is used to estimate the speed distributions. Between the successive iterations, a particle moves at its speed (modulo the introduction of a random error).

The basic idea of these algorithms is to randomly spread the particles in space, such that their movement follows the movement of dynamic material bodies. The particles are distributed within the grid such that a large number of particles are present in the cells occupied by dynamic material bodies.

Although the introduction of particle filters has reduced algorithmic complexity and also memory consumption, implementation at present still requires processing units with tens of gigaflops to operate in real time. Current state-of-the-art implementations are performed on graphical maps integrated into consumer computers.

Integration into more specific on-board systems such as microcontrollers still remains a challenge, since the specification of important parameters such as the number of particles is not yet clear. There is no formal method for determining the minimum number of particles for the particle filter to converge.

Using particle filters also makes the algorithms non-deterministic. Specifically, particle filters are based on a sampling step, which essentially consists in drawing particles on the basis of their weight with a known sampling distribution.

The sampling process is a random process in which it is necessary to generate random numbers during implementation. Therefore, two executions of these algorithms based on the same sequence of sensor measurements might not produce exactly the same results. This non-deterministic property makes it difficult to verify these algorithms.

In the second dynamic cell detection approach, the state of the cell is expanded by a second binary variable, which is the dynamicity of the cell: is the cell dynamic or not (that is to say static). No speed distribution is computed.

The probability of a cell being dynamic is estimated on the basis of a lightweight analysis of the inconsistencies between the successive occupancy grids (see for example the article by Trung-Dung Vu, Olivier Aycard, Nils Appenrodt "Online Localization and Mapping with Moving Object Tracking in Dynamic Outdoor Environments", 2007 IEEE Intelligent Vehicles Symposium, June 2007, Istanbul, Turkey (inria-00194152)). For example, a cell is probably dynamic if it was probably free in the previous iteration and probably occupied in the current iteration.

This means that no material body was present in the cell in the previous iteration, whereas, between the two iterations, a material body moved and reached the cell in the current iteration.

The approaches that detect dynamic cells are lightweight in terms of computing in comparison with the independent cell tracking approaches. They consume less in terms of computing since only one binary state per cell (dynamicity) is estimated, rather than a probability distribution over a certain number of speeds.

However, they are lacking an estimate of the dynamic movement of the cells, an estimate that is provided by the speed distributions or by the particles in the case of independent cell tracking.

SUMMARY OF THE INVENTION

The invention therefore aims to provide a method for estimating the movement of a material body in a surrounding space, the implementation of which will meet on-board integration constraints, while still being able to estimate the dynamic movement of the cells.

One subject of the invention is therefore an iterative method, implemented by a computer or by a dedicated electronic circuit, for estimating the movement of at least one material body in a surrounding space discretized into a grid of cells, wherein, for each given iteration t, the following steps are implemented: a) obtaining an inconsistency grid in iteration t ($IG_t$), generated in response to detection of a change of occupancy state in at least one of the cells of the grid of cells between an iteration t-1 and iteration t, b) recurrently generating a filtered movement grid in iteration t ($FMG_t^d$, $FMG_t^s$) comprising, for each cell of the grid of cells, a posterior probability ($P(d_{t,i}^A|z_{1:t})$, $P(s_{t,i}^A|z_{1:t})$), of the material body having performed a movement with at least one movement component characterizing said movement, said movement component forming part of a discrete set of movement components, said filtered movement grid in iteration t ($FMG_t^d$, $FMG_t^s$) being generated on the basis of the filtered movement grid in iteration t-1 ($FMG_{t-1}^d$, $FMG_{t-1}^s$), of an inconsistency grid from iteration t-1 ($IG_{t-1}$), and of the inconsistency grid in iteration t ($IG_t$).

Advantageously, step b) comprises applying a binary Bayesian filter, each movement component of the discrete set of components being an independent variable of a binary Bayesian filter, the posterior probability ($P(d_{t,i}^A|z_{1:t})$, $P(s_{t,i}^A|z_{1:t})$) corresponding to the output of said filter.

Advantageously, step a) comprises generating a feature grid in iteration t ($FG_t$), each cell having a first Boolean value corresponding to a predetermined first occupancy state, or having a second Boolean value different from the first if not, the inconsistency grid in iteration t ($IG_t$) being generated on the basis of the change of Boolean value of each cell between the feature grid in iteration t ($FG_t$) and a feature grid generated in an iteration t-1 ($FG_{t-1}$).

Advantageously, the method comprises the following preliminary steps:

a1) acquiring a plurality of distance measurements for said material bodies from one or more sensors;

a2) applying an inverse model of the corresponding sensor to the grid of cells in each distance measurement in order to determine a probability of occupancy by a material body for a set of cells of said grid of cells; and a3) constructing the feature grid on the basis of the occupancy probabilities estimated in step a2).

Advantageously, the posterior probability ($P(d_{t,i}^A|z_{1:t})$), is approximated by a value belonging to a finite-cardinality set, said value being identified by an integer index $n(d_{t,i}^A|z_{1:t})$.

Advantageously, in step b), a propagated index $n(d_{t-1,i}^A|z_{1:t-1})$ is computed for each element of the filtered movement grid in iteration t ($FMG_t^d$) on the basis of indices of the filtered movement grid $FMG_{t-1}^d$ computed in the previous iteration t-1, using the following relationship:

$$n(d_{t-1,i}^A|z_{1:t-1}) = \max(FMG_{t-1}^d(A',i))$$

For each cell A' preceding cell A in the direction i at the time t-1;

And then a binary Bayesian filter is applied whose inputs are the propagated index $n(d_{t-1,i}^A|z_{1:t-1})$, a probability index of the inverse sensor model $n(d_{t,i}^A|z_t)$ that corresponds to the probability $P(d_{t,i}^A|z_t)$ of a cell A following the movement component i in iteration t, knowing only the sensor measurement $z_t$ produced in the same iteration, a probability $P(d_t^A|d_{t-1}^A)$ of the movement component of the material body not varying between iterations t-1 and t, and a probability $P(d_t^A|\overline{d_{t-1}^A})$ of the movement component of the material body varying between iterations t-1 and t.

Advantageously, the index $n(d_{t,i}^A|z_{1:t-1})$ corresponding to the prediction component of the binary Bayesian filter for the movement component estimate is obtained using a lookup table comprising a finite set of probability indices, and the filtered index $n(d_{t,i}^A|z_t)$ is obtained by adding integer probability indices.

Advantageously, the probability $P(d_t^A|d_{t-1}^A)$ of retaining the same movement component between iterations t-1 and t and the probability $P(d_t^A|\overline{d_{t-1}^A})$ of changing movement component between iterations t-1 and t are parameters that are constant as a function of time.

Advantageously, $n(d_{t,i}^A|z_t)=\eta_d>0$ if, in the inconsistency grid from iteration t-1 ($IG_{t-1}$) and in the inconsistency grid in iteration t ($IG_t$), a change of Boolean value was measured in the movement component i with respect to cell A, where $\eta_d$ is an integer constant; $n(d_{t,i}^A|z_t)=0$ if not.

Advantageously, said finite-cardinality set of probability classes is formed by combining one or more subsets such that, in step a3), fusing two probability classes belonging to one and the same subset provides a result also belonging to said subset.

Advantageously, the finite-cardinality set of probability classes, denoted by $G_p$, is formed by combining two subsets $G_p^-$ and $G_p^+$ defined by:

$$G_p^- = \{(q_n), n \leq 0\}$$

$$G_p^+ = \{(q_n), n \leq 0\}$$

the index n taking relative integer values, and the numerical values of the probability classes $q_n$ being defined recurrently as follows:

$$(q_n)_{n \in \mathbb{Z}} = \begin{cases} \frac{1}{2} & \text{if } n = 0 \\ \frac{1}{2} + \epsilon & \text{if } n = 1 \\ \frac{1}{2} - \epsilon & \text{if } n = -1 \\ F(q_{n-1}, q_1) & \text{if } n > 1 \\ F(q_{n-1}, q_{-1}) & \text{if } n < -1 \end{cases}$$

Where $\in$ is a predetermined parameter and wherein, in said step a3), the fusion $F(q_n, q_m)$ between two probability classes $q_m$, $q_n$ is computed by applying the following equation:

$$F(q_n, g_m) = q_{m+n}$$

Advantageously, the movement component corresponds to a direction between two cells of the grid of cells, or to a displacement speed from one cell to another in a given direction.

The invention also relates to a method for avoiding a material body moving around a mobile body, implementing the abovementioned method for estimating the movement of the material body, and that it sends a command to an actuator of the mobile body in order to avoid said material body.

The invention also relates to a device for estimating the movement of a material body in a space surrounding a mobile body, comprising: at least one input port for receiving a plurality of signals representative of a time series of distance measurements from one or more distance sensors, and a data processor configured so as to receive said signals at input, to generate a feature grid ($FG_t$) on the basis of said signals, and to characterize dynamics of the material body by applying an abovementioned method.

The invention also relates to a device for estimating the movement of a material body in a space surrounding a mobile body, comprising:
  at least one input port for receiving a time series of feature grids from one or more event cameras, and
  a data processor configured so as to receive said series at input and to characterize dynamics of the material body by applying an abovementioned method.

The invention also relates to a mobile body comprising an abovementioned device.

BRIEF DESCRIPTION OF THE DRAWINGS

Other features, details and advantages of the invention will become apparent on reading the description, which is given with reference to the appended drawings, which are given by way of example and in which, respectively.

DETAILED DESCRIPTION

Figure 1:
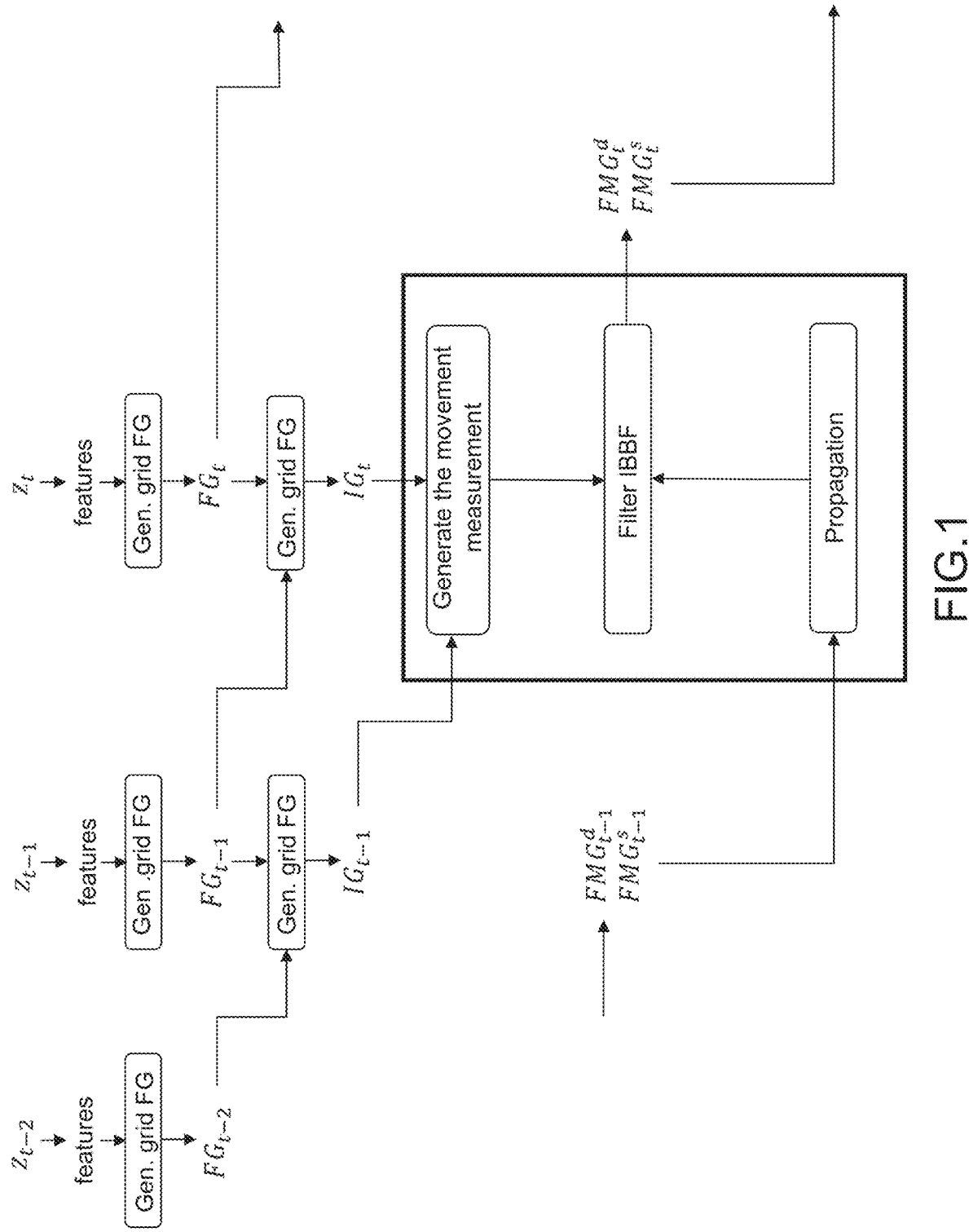
FIG. 1 shows an overall view of the method according to the invention, in an iteration t.

FIG. 1 schematically shows the various input and output data of the method according to the invention.

The method according to the invention is presented according to a first embodiment, in which the movement of a material body is characterized by a first movement component corresponding to direction and by a second movement component corresponding to speed. A direction mask and a speed mask will therefore be used.

Feature Grid Generation

The method works iteratively: in each iteration t, a new series of measurements is performed, thereby making it possible to update the estimate of the movement. In each iteration t, a feature grid is generated, this hereinafter being called feature grid in iteration t $FG_t$.

It is then observed whether some cells of the feature grid that are "FALSE" in a given iteration become "TRUE" in the following iteration (or vice versa). The appearance or disappearance information is found in the inconsistency grid in iteration t $IG_t$.

In each iteration t, there is therefore the inconsistency grid in iteration t $IG_t$ and the inconsistency grid in iteration t $IG_{t-1}$.

As may be seen in FIG. 1, a filtered direction movement grid in iteration t $FMG_t^d$ and a filtered speed movement grid in iteration t $FMG_t^s$ are then generated, these being determined recurrently on the basis of the inconsistency grid in iteration t $IG_t$, of the inconsistency grid in iteration t $IG_{t-1}$, and respectively of the filtered direction movement grid in iteration t-1 $FMG_{t-1}^d$ and of the filtered speed movement grid in iteration t-1 $FMG_{t-1}^s$.

The idea on which the invention is based consists in describing the movement of each cell of the grid through a finite and discrete set of directions, and each direction is then discretized into a finite number of speeds.

This discrete representation of the displacement directions and speeds is easily configurable and has a linear impact on the temporal complexity and on the memory resources required to execute the algorithm.

The user, by acting on the number of directions and/or on the number of speeds, is thus able to act on the accuracy of the movement model and on the implementation and execution performance. In particular, the algorithmic complexity depends on the number of cells of the grid, on the number of cells of each mask, on the number of directions and on the number of speeds per direction.

The estimate of the dynamics of material bodies moving around the sensor is thus performed deterministically, the method according to the invention not requiring any random number generation.

Knowing the iteration frequency of the measurements f, the length of each cell $l_c$, and the length of the mask $l_m$ (in terms of number of cells), it is possible to easily determine the minimum speed detected per iteration ($v_{min}=l_c \times f$), and also the minimum speed detected per iteration $$\left(v_{max} = \frac{l_c \times l_m \times f}{2}\right),$$

and notably act on the size of the mask in order to adjust the minimum detection speed and the maximum detection speed.

Figure 2:
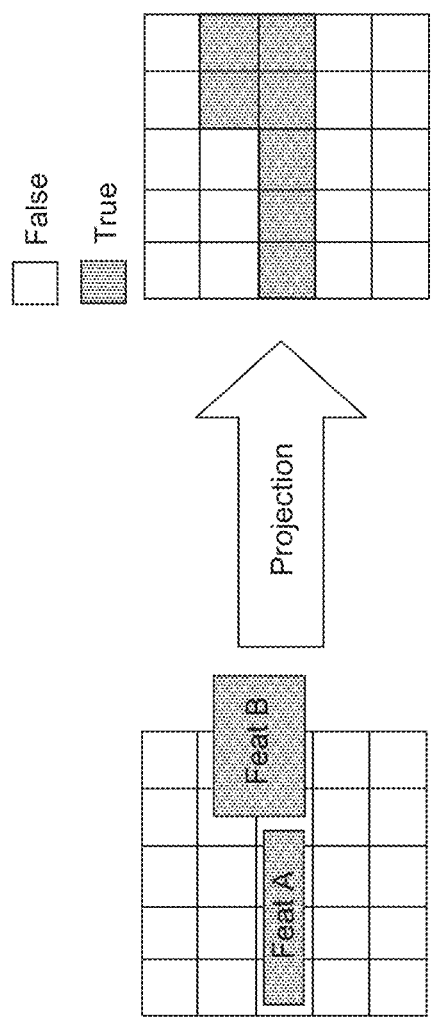
FIG. 2 shows one example of a feature grid in iteration t.

The left-hand part of FIG. 2 illustrates two material bodies detected in iteration t, specifically the bodies "Feat A" and "Feat B". The feature grid $FG_t$, illustrated by the right-hand part of FIG. 2, may be generated based on a series of distance measurements from one or more sensors. Based on the distance measurement, an occupancy probability is then determined, this depending on the inverse model of the sensor, as described notably in patent application FR3041451.

This thus gives an occupancy probability for each cell of the grid of cells of between 0 and 1 (occupancy grid). This probability is then transformed into a Boolean value (of the type TRUE/FALSE) by applying a threshold, which may typically be equal to 0.5.

To simplify the disclosure, the invention will be described with a single sensor for performing the distance measurements. Performing the same computations with measurements from multiple sensors does not pose any problem to a person skilled in the art.

The feature grid $FG_t$, illustrated for example by FIG. 2, therefore has as many cells as the occupancy grid, and each cell has a Boolean value specific to the occupied or unoccupied nature.

Inconsistency Grid Generation

Figure 3:
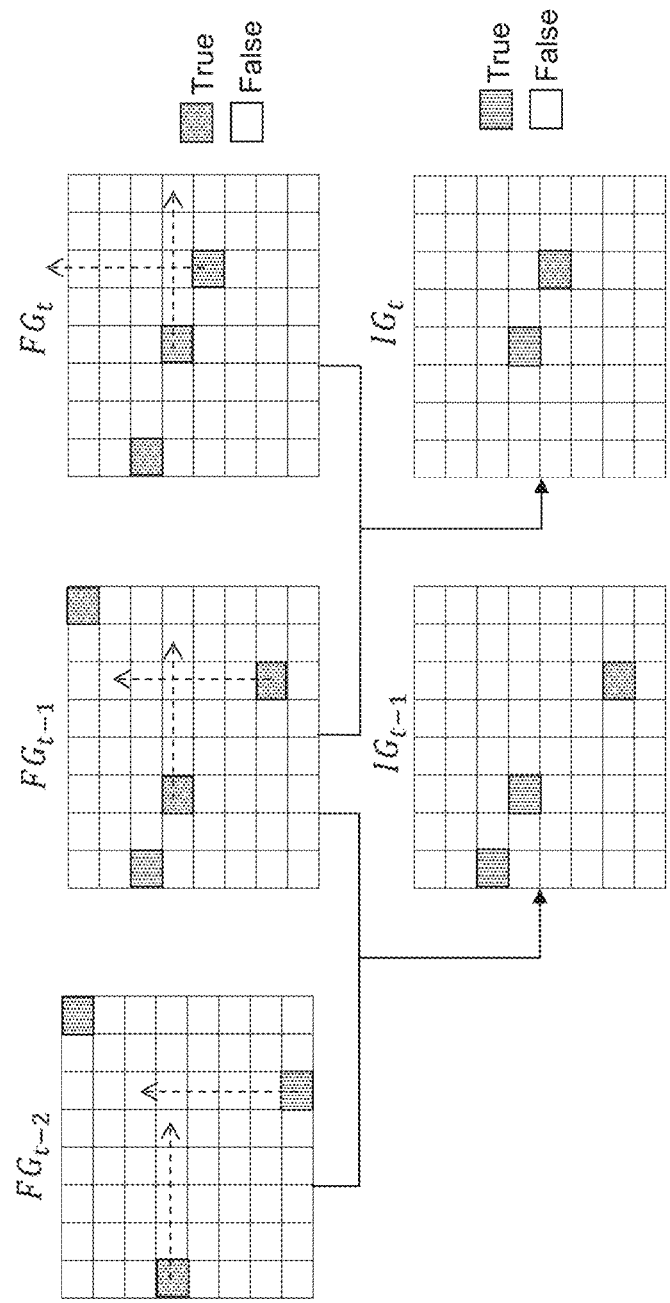
FIG. 3 shows one example of an inconsistency grid in iteration t and in iteration t-1.

FIG. 3 illustrates, for three successive iterations, the feature grid in iteration t-2 ($FG_{t-2}$), the feature grid in iteration t-1 ($FG_{t-1}$) and the feature grid in iteration t ($FG_t$). In each of these grids, it is possible to see cells whose occupancy probability is greater than the chosen threshold.

Two inconsistency grids $IG_{t-1}$ and $IG_t$ are constructed.

Each cell of the inconsistency grid $IG_{t-1}$ takes the Boolean value "TRUE" if the corresponding cell of the feature grid $FG_{t-1}$ has seen its Boolean value change between the feature grid $FG_{t-2}$ and the feature grid $FG_{t-1}$.

Likewise, each cell of the inconsistency grid $IG_t$ takes the Boolean value "TRUE" if the corresponding cell of the feature grid $FG_t$ has seen its Boolean value change between the feature grid $FG_{t-1}$ and the feature grid $FG_t$.

Such a cell takes a first Boolean value, for example "TRUE", the other cells taking a second Boolean value, for example "FALSE". This thus gives, for three successive iterations, two inconsistency grids $IG_{t-1}$ and $IG_t$. In the example of FIG. 3, the inconsistency grid $IG_{t-1}$ comprises three inconsistent cells, and the inconsistency grid $IG_t$ comprises two of them.

The inconsistency grids are thus computed by the computer or by the dedicated electronic circuit implementing the method according to the invention, on the basis of the feature grids, which themselves originate from measurements from at least one sensor.

As an alternative, the inconsistency grids may be provided directly by event cameras, which make it possible to generate event image data in response to detection of a change in a scene that is located within its field of view. A person skilled in the art may refer for example to patent application FR3065133 on this subject.

Generation of the Displacement Measurement

Whether the inconsistency grids have been provided directly by the sensor or computed on the basis of a distance measurement, there is computed, in iteration t, for each cell of the grid, a posterior probability $P(d_{t,i}^A|z_{1:t})$ of a material body located in a cell A of the grid of cells moving in the direction i, from among a discrete set of directions around cell A, knowing all of the measurements $z_{1:t}$ between iteration 1 and iteration t, and a posterior probability $P(s_{t,i,j}^A|z_{1:t})$ of a material body located in a cell A of the grid of cells moving in the direction i at the speed j, knowing all of the measurements $z_{2:t}$ between iteration 1 and iteration t.

d corresponds to the direction movement component, and s corresponds to the speed movement component. A corresponds to the identifier of one of the cells of the grid of cells. $z_i$ corresponds to the $i^{th}$ observation/measurement. $z_{1:t}$ thus corresponds to all of the measurements between iteration 1 and iteration t.

The posterior probability $P(d_{t,i}^A|z_{1:t})$ and the posterior probability $P(s_{t,i,j}^A|z_{1:t})$ may be computed by the algorithm of the binary Bayesian filter, which makes it possible to recursively estimate the probability distribution of a random binary variable.

The binary Bayesian filter comprises two main steps, specifically predicting and updating measurements. The prediction makes it possible to predict the current occupancy state on the basis of previous measurement sequences, and the updating makes it possible to correct the predicted estimate with new measurements.

These computations may be performed using floating point arithmetic operations, thereby requiring significant resources in terms of computing power that are not very compatible with constraints specific to on-board systems.

The posterior probability $P(d_{t,i}^A|z_{1:t})$ is approximated by a value belonging to a finite-cardinality set of numerical values between 0 and 1. Since the set is finite, its elements may be identified uniquely by an index that is an integer. Let $n(d_{t,i}^A|z_{1:t})$ be the index of the element that corresponds to the numerical value of $P(d_{t,i}^A|z_{1:t})$. Likewise, the index $n(s_{t,i,j}^A|z_{1:t})$ represents the index of the element that corresponds to the numerical value of the posterior probability $P(s_{t,i,j}^A|z_{1:t})$. Since the index $n(d_{t,i}^A|z_{1:t})$ and the index $n(s_{t,i,j}^A|z_{1:t})$ are integers, these indices are computed using far simpler integer arithmetic operations, while still retaining an acceptable and configurable accuracy level (bijection between an integer and a real number between 0 and 1) on the basis of the available computing resources.

Figure 4:
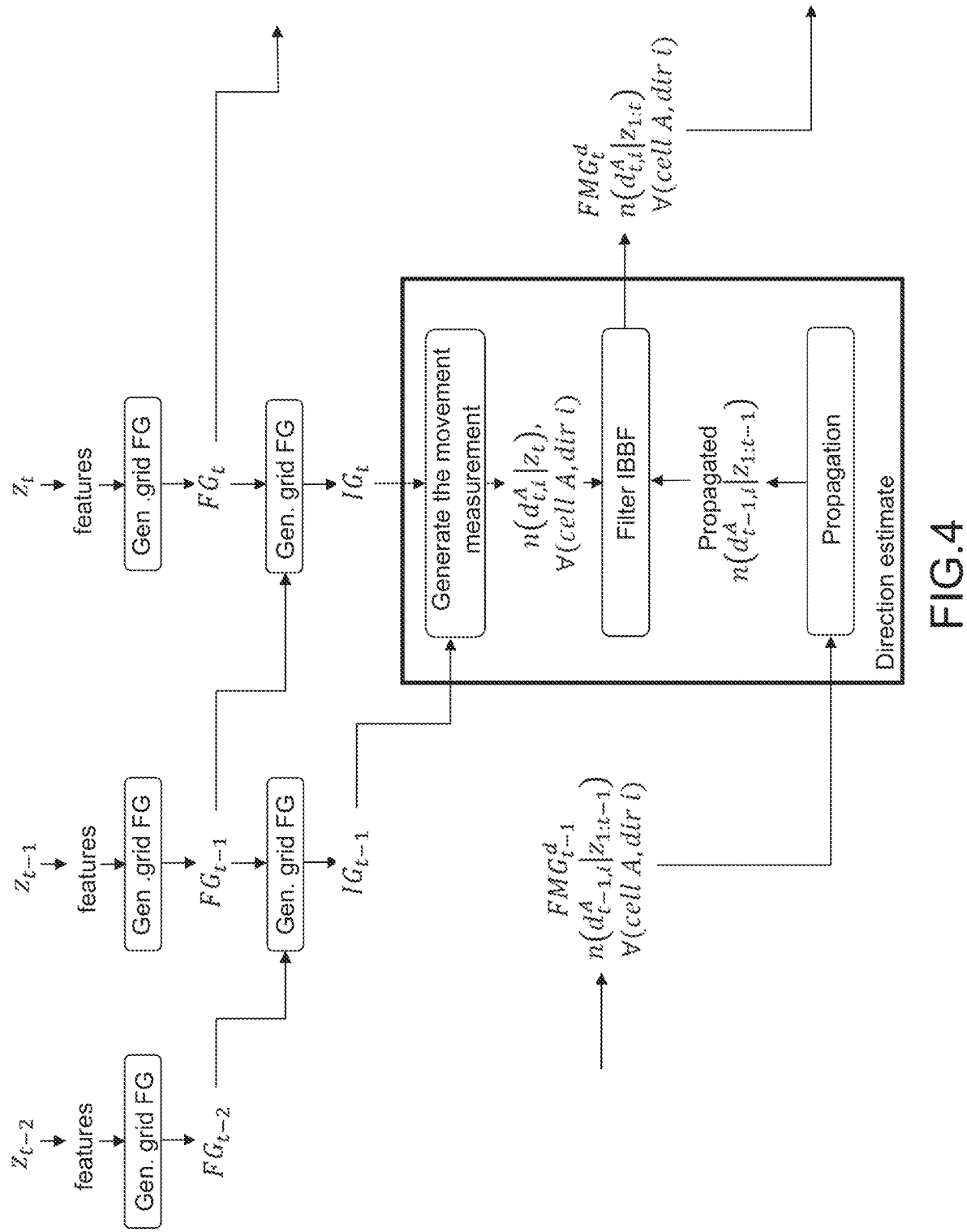
FIG. 4 shows a detailed view of the generation of a filtered direction movement grid in iteration t.

FIG. 4, which is specific to the direction estimate, adopts some of the features from FIG. 1. The binary Bayesian filter processing integer data, which will hereinafter be called integer binary Bayesian filter, receives, in each iteration t, a set of propagated indices, resulting from a process of propagating the indices in the previous iteration t-1 $n(d_{t-1,i}^A|z_{1:t-1})$, and the index of the inverse sensor model $n(d_{t,i}^A|z_t)$, which corresponds to the probability $P(d_{t,i}^A|z_t)$ of a cell A following the direction i in iteration t, knowing only the sensor measurement $z_t$ produced in the same iteration.

For each inconsistency cell A of the inconsistency grid $IG_t$ having the first Boolean value (for example the value "TRUE"), the predecessors of these cells in the inconsistency grid $IG_{t-1}$ will therefore be looked at, and the direction mask will be applied.

Thus, for the direction mask, consideration is given to a "direction" movement component, which corresponds to a direction for moving from one cell to another.

Figure 5:
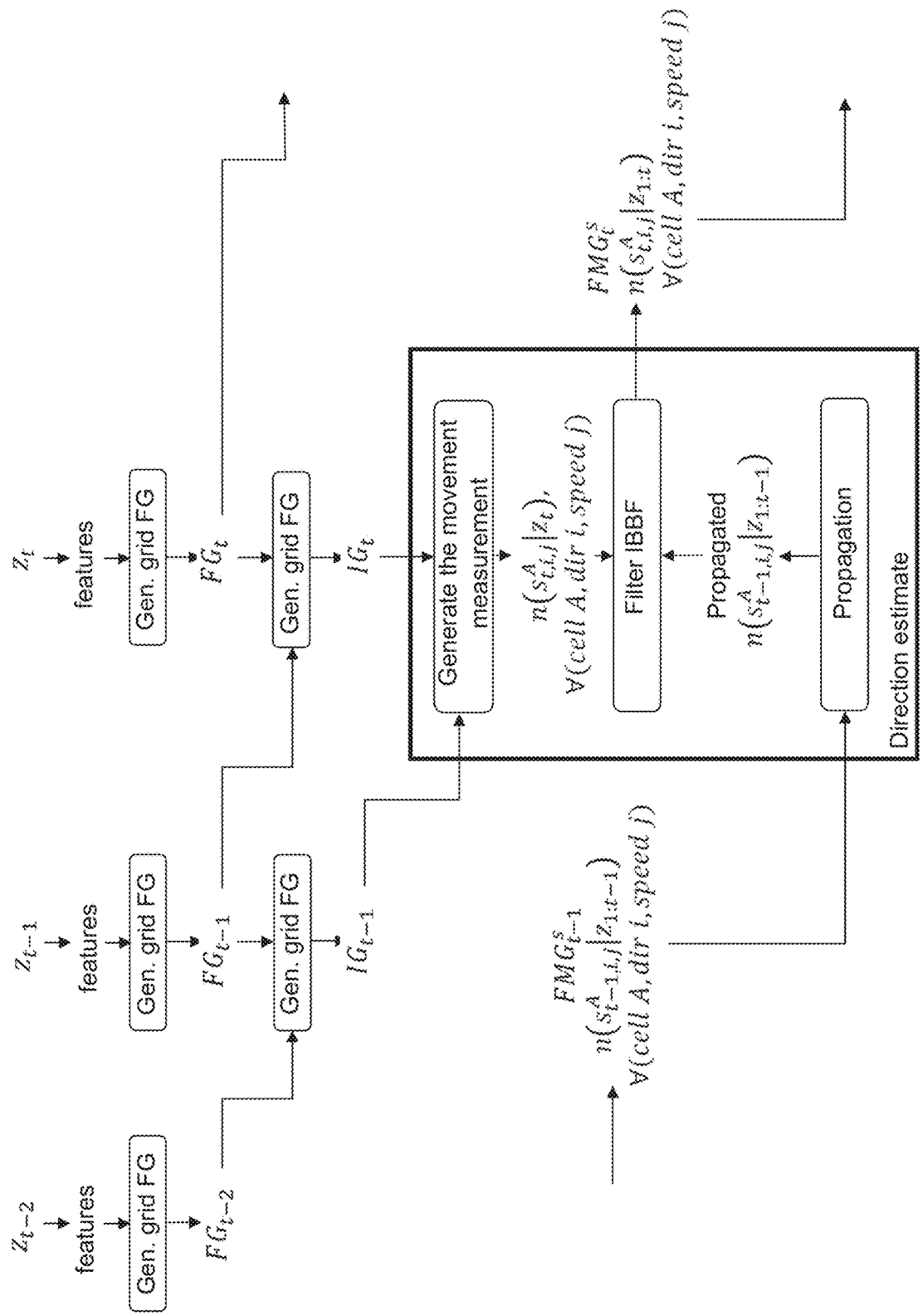
FIG. 5 shows a detailed view of the generation of a filtered speed movement grid in iteration t.

The same principle is used to estimate speed, as illustrated in FIG. 5. This gives, in each iteration t, the index $n(s_{t,i,j}^A|z_{1:t})$, for each cell A of the grid for each direction i and for each speed j.

Thus, for the speed mask, consideration is given to a "speed" movement component, which corresponds to the displacement speed from one cell to another in a given direction.

Figure 6B:
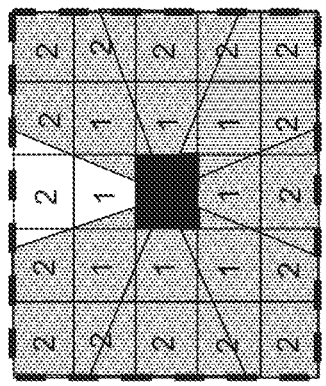
FIG. 6B shows a speed mask for dividing all of the displacement speeds around a given cell.
Figure 6A:
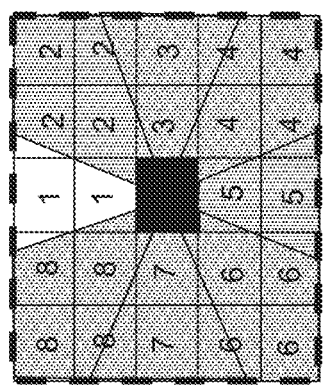
FIG. 6A shows a direction mask for dividing all of the displacement directions around a given cell.

FIG. 6A illustrates one example of a direction mask, and FIG. 6B illustrates one example of a speed mask. The direction mask contains 5×5 cells, and eight directions, and the speed mask contains 5×5 cells and two speeds, but other values may of course be adopted.

Cell A is located in the center of the mask. Each direction starting from the cell is an independent binary random variable. To estimate the direction (cf. FIG. 4), use is thus made of one integer binary Bayesian filter per direction.

Likewise, as illustrated in FIG. 6B, each direction starting from a cell has Ns speeds, and each speed is an independent binary random variable. To estimate the speed (cf. FIG. 5), use is thus made of one integer binary Bayesian filter per speed.

Considering each direction or each speed (from among a discrete set) as independent variables of a binary Bayesian filter makes it possible to estimate the displacement of multiple material bodies occupying one and the same cell at a time t, with change of direction and/or speed probabilities whose sum is not necessarily equal to 1.

For example, two pedestrians may be in one and the same cell at a time t. The method may take into account a probability equal to 0.9 that one of the pedestrians will turn left, and a probability equal to 0.9 that the other pedestrian will turn right.

Figure 7:
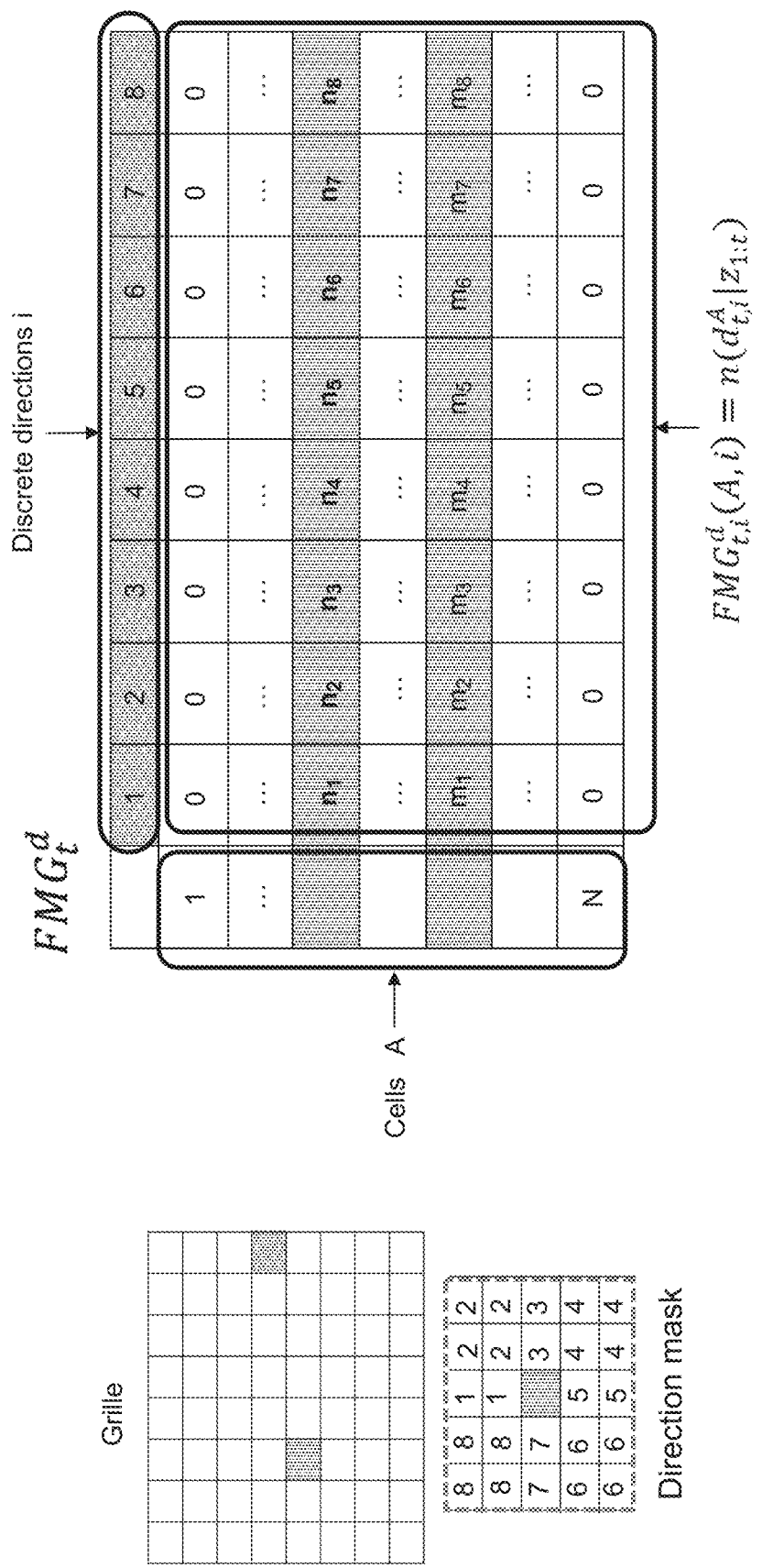
FIG. 7 shows a table indicating the indices of each direction of the direction mask, around each cell of the grid.

FIG. 7 illustrates the filtered direction movement grid in iteration t, $FMG_t^d$, which is a data structure used for the direction estimate. On the left is a grid in which two cells A and B are given values. The entries in the filtered direction movement grid corresponding to cells are also given values on the right of the figure.

The data structure corresponds to a dual-entry table. Each row corresponds to a cell of the grid. Each column corresponds to one of the directions of the discrete set of directions.

The following notation is adopted: for cell A, each column i takes the index $n(d_{t,i}^A|z_{1:t})$. For cell B, each column i takes the index $n(d_{t,i}^B|z_{1:t})$.

It is assumed, in the method according to the invention, that an inconsistent cell, that is to say a cell in the inconsistency grid, is potentially dynamic. It will be assumed that the content of cell A moves between iterations t-1 and t. The content of A is located in A in iteration t, but it may be located in other cells close to A in t-1.

The set of possible locations of the content of A at t-1 is called "predecessors" of A. The zone where the predecessors of A are located is delimited by the direction mask and the speed mask.

The predecessors may be defined with regard to directions and speeds. The following functions denote the predecessors of a cell with regard to directions and speeds:

Antecedents$_d$(A,i) denotes the set of possible predecessors of cell A with respect to the direction i.

Antecedents$_s$(A,i,j) denotes the set of possible predecessors of cell A with regard to the speed j in the direction i.

Figure 8:
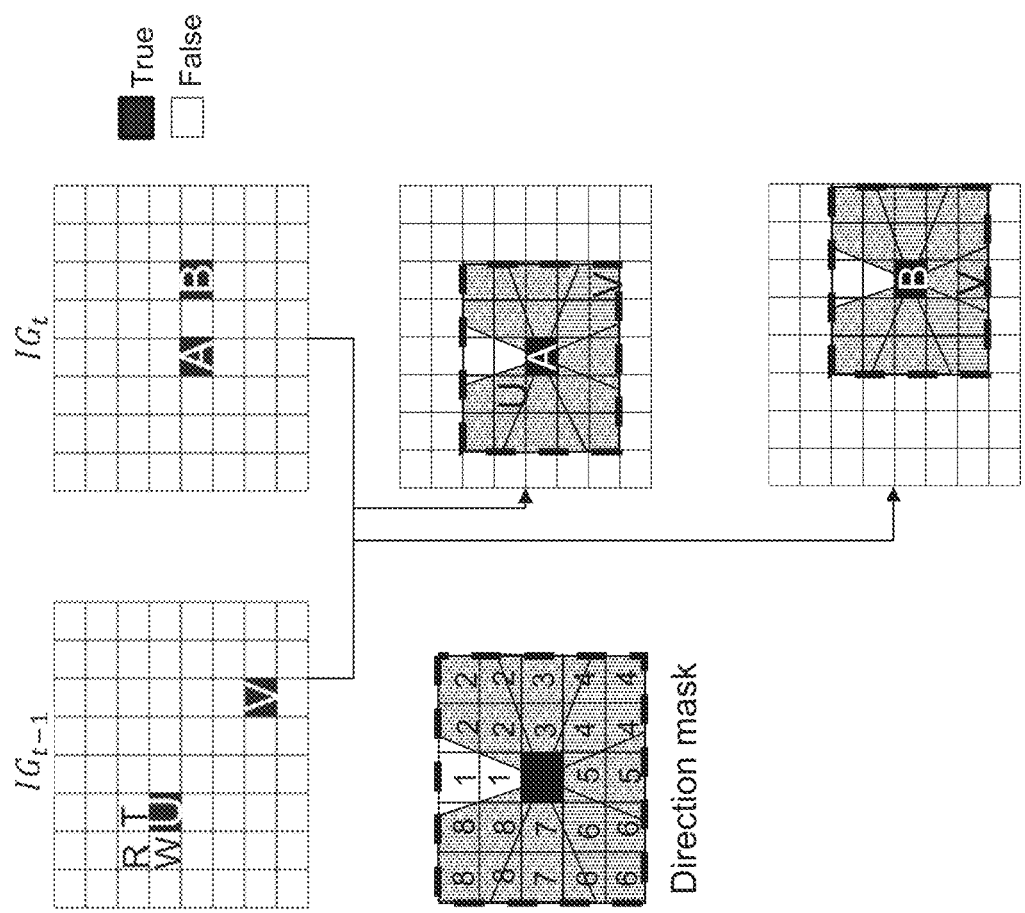
FIG. 8 shows one example of an inconsistency grid to which a direction mask is applied.

FIG. 8 illustrates the functions Antecedents$_d$ and Antecedents$_s$. In this figure, the inconsistent cells in iteration t-1 are cells U and V. The inconsistent cells in iteration t are cells A and B. The predecessors of cell A with respect to direction 8 are: Antecedents$_d$(A, 8)={R, T, W, U}.

Likewise, the predecessors of cell A with regard to the speed 1 in direction 8 are: Antecedents$_d$(A, 8,1)={U}.

The predecessors of cell A with regard to the speed 2 in direction 8 are: Antecedents$_d$(A, 8,2)={R, T, W}.

The measure of the displacement in the grid may then be expressed by the following functions MeasureDirection and MeasureSpeed, defined below.

The function MeasureDirection checks whether a cell A has potentially moved in the direction i between iterations t-1 and t. This function returns a Boolean value:

$$\text{MeasureDirection}(A, i, IG_{t-1}, IG_t) = \begin{cases} \text{True if } IG_t(A) = \text{True} \wedge \exists A' \in \text{Predecessors}_d(A, i) \text{ such that } IG_{t-1}(A') = \text{True} \\ \text{False if not} \end{cases}$$

The function MeasureSpeed checks whether a cell A has potentially moved with respect to the direction i and the speed j between iterations t-1 and t. This function returns a Boolean value:

$$MeasureSpeed(A, i, j, IG_{t-1}, IG_t) = \begin{cases} \text{True if } IG_t(A) = \text{True} \wedge \exists A' \in Predecessors_s(A, i, j) \text{ such that } IG_{t-1}(A') = \text{True} \\ \text{False if not} \end{cases}$$

Applying the two movement measurement functions to the examples of FIG. 8 gives the following results. The function MeasureDirection will return "FALSE" except for MeasureDirection(A, 8, $IG_{t-1}$, $IG_t$), MeasureDirection(A, 4, $IG_{t-1}$, $IG_t$) and MeasureDirection(B, 5, $IG_{t-1}$, $IG_t$).

Furthermore, the function MeasureSpeed will return "TRUE" for MeasureSpeed(A, 8,1, $IG_{t-1}$, $IG_t$), MeasureSpeed(A, 4, 2, $IG_{t-1}$, $IG_t$) and MeasureSpeed(B,5,2,$IG_{t-1}$, $IG_t$), and "FALSE" for the other arguments of the function.

Next, indices $n(d_{t,i}^A|z_t)$ of the inverse sensor model are determined, these constituting the contribution to updating the measurements $z_t$ produced in iteration t in the binary Bayesian filter.

These indices are determined with respect to the results of the function MeasureDirection and of the function MeasureSpeed described above:

$$n(d_{t,i}^A | z_t) = \begin{cases} \eta_d > 0 \text{ if } MeasureDirection(A, i, IG_{t-1}, IG_t) = \text{TRUE} \\ 0 \text{ if not} \end{cases}$$

$$n(s_{t,i,j}^A | z_t) = \begin{cases} \eta_s > 0 \text{ if } MeasureSpeed(A, i, j, IG_{t-1}, IG_t) = \text{TRUE} \\ 0 \text{ if not} \end{cases}$$

The parameters $\eta_d$ and $\eta_s$ are positive integers that are constant and chosen empirically.

The propagation of the indices of the posterior probabilities of the predecessors are then computed. This step is illustrated in FIG. 9.

For this purpose, for each element of the filtered direction movement grid in iteration t $FMG_t^d$, a propagated index $n(d_{t-1,i}|z_{1:t-1})$ is computed on the basis of the indices of the filtered direction movement grid$FMG^{t-1}_d$ computed in the previous iteration t-1:

$$n(d_{t-1,i}^A|z_{1:t-1}) = \max(FMG_{t-1}^d(A',i))$$

Figure 9:
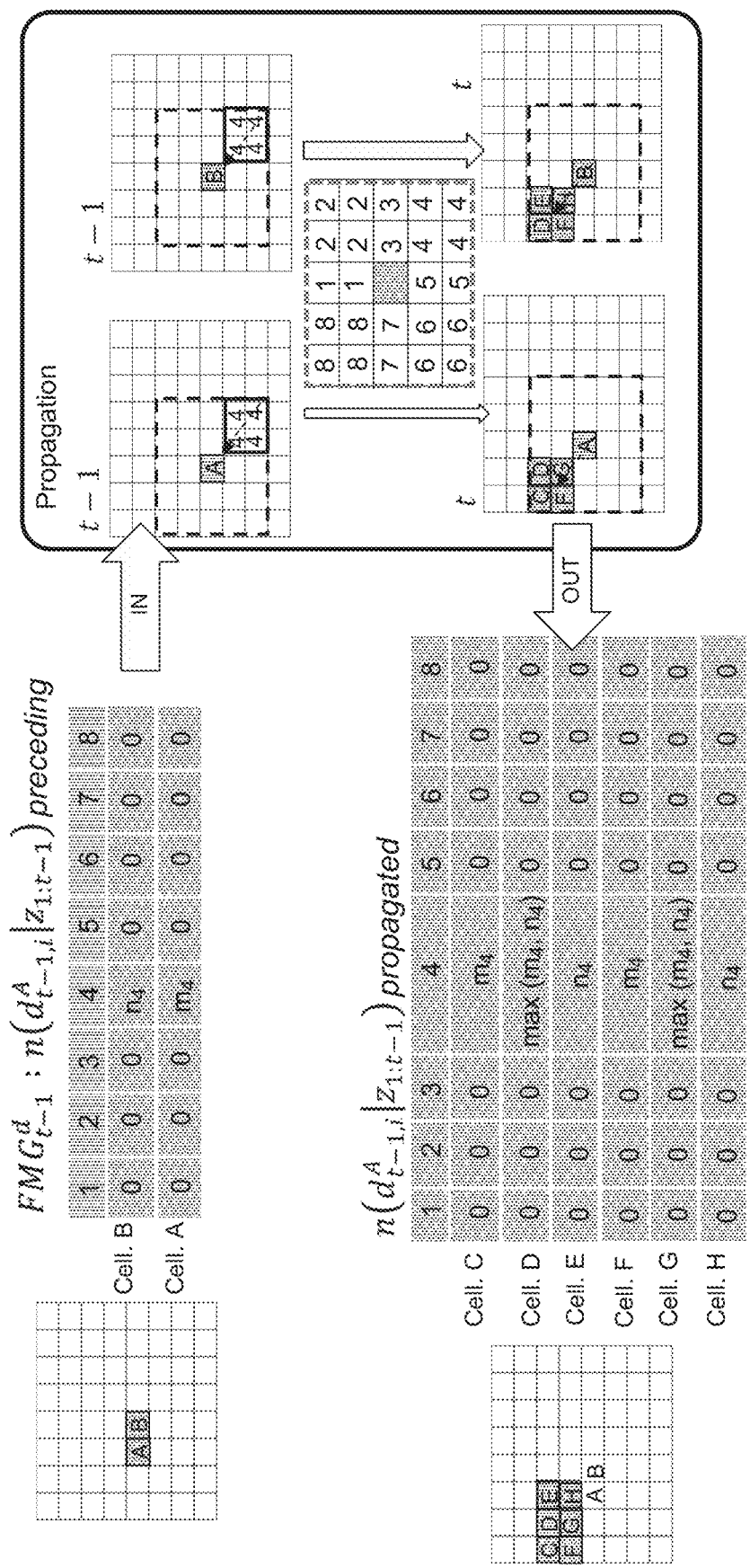
FIG. 9 shows the computation of the propagation of the indices of a cell, as a function of the indices of the filtered movement grid in the previous iteration.
Figure 10:
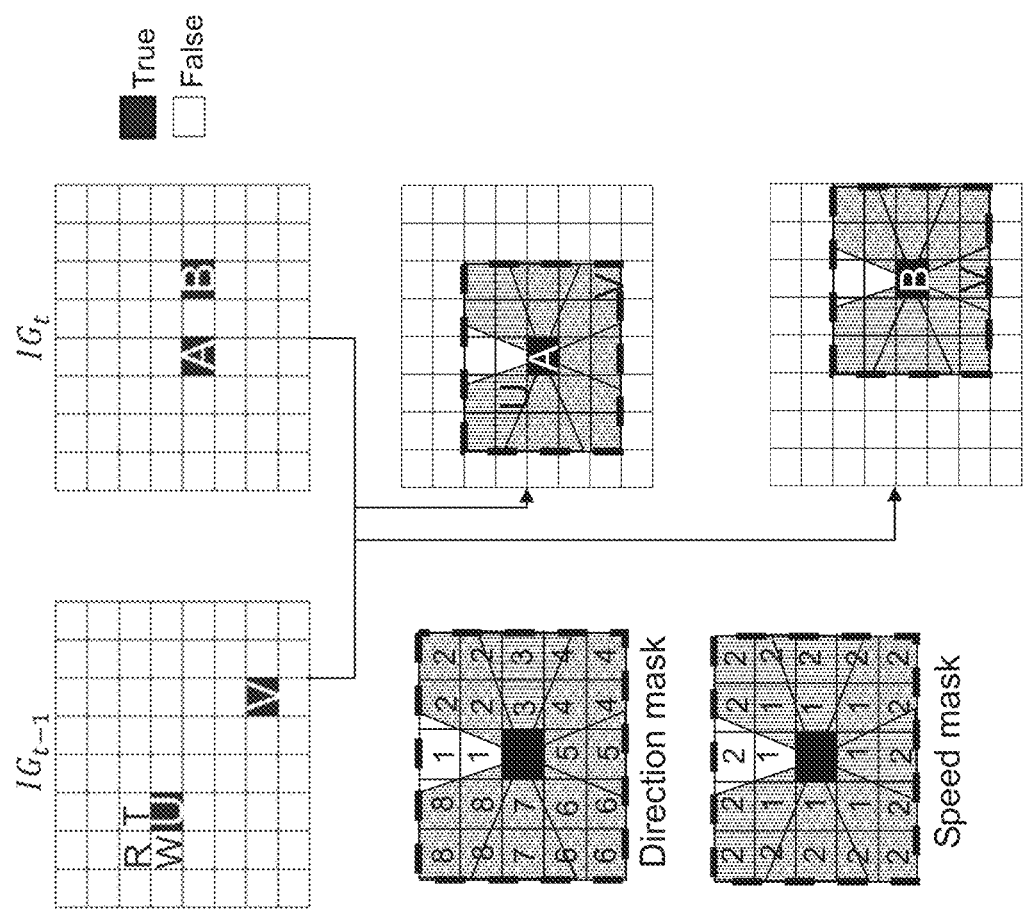
FIG. 10 shows one example of an inconsistency grid to which a speed mask is applied.

In FIG. 9, consideration is given by way of example to two cells A and B, propagating, between t-1 and t, in the direction 4. Thus, for cell A, the index $n(d_{t-1,4}^A|z_{1:t-1})$ in the filtered direction movement grid $FMG_{t-1}^d$ has the value $m_4$, and is zero for the other directions.

For cell B, the index $n(d_{t-1,4}^B|z_{1:t-1})$ in the filtered direction movement grid $FMG_{t-1}^d$ has the value $n_4$, and is zero for the other directions. The other cells are not shown in the table, the corresponding probability index being zero for all of the directions.

The propagation process propagates the non-zero indices in the filtered direction movement grid $FMG_{t-1}^d$ to other cells along the corresponding directions.

In the example of FIG. 9, only cells A and B have non-zero indices in the filtered direction movement grid $FMG_{t-1}^d$. These indices concern the direction 4 for the two cells. Their indices in the other directions are zero.

The result of the propagation process is illustrated at the bottom left of FIG. 9. Only cells C, D, E, F, G and H have non-zero propagated indices. The propagated indices of the other cells are zero for all of the directions. For cell C, its sole predecessor having non-zero indices in $FMG_{t-1}^d$ is cell A in direction 4. The propagated index $n(d_{t-1,4}^C|z_{1:t-1})$ of cell C in direction 4 thus has the value $m_4$. The predecessors of cell D having non-zero indices in $FMG_{t-1}^d$ are cells A and B in direction 4. The propagated index $n(d_{t-1,4}^D|z_{1:t-1})$ thus has the value $\max(n_4, m_4)$.

Displacement Filtering

Once the propagated indices have been computed, the integer binary Bayesian filter is applied. The filtering is applied for each new incoming measurement, specifically in each iteration.

It will be recalled that the input data are the propagated index from previous iteration t-1 $n(d_{t-1,i}^A|z_{1:t-1})$ and also the probability index $n(d_{t,i}^A|z_t)$, which constitutes the contribution to updating the measurements in the integer binary Bayesian filter.

This step takes advantage of the integer fusion function for the filtering function, using only an integer arithmetic operation. The posterior probability $P(d_{t,i}^A|z_{1:t})$ and the posterior probability $P(d_{t,i,j}^A|z_{1:t})$ have been represented in discretized form, respectively, by an index $n(d_{t,i}^A|z_{1:t})$ and by an index $n(d_{t,i,j}^A|z_{1:t})$, in a finite-cardinality set of probability classes.

The finite-cardinality set of probability classes is formed by combining one or more subsets such that, in the step of updating the measurement, fusing two probability classes belonging to one and the same subset provides a result also belonging to said subset.

Advantageously, the finite-cardinality set of probability classes, denoted by $G_p$, is formed by combining two subsets $G_p^-$ and $G_p^+$ defined by:

$$G_p^- = \{q_n\}, n \leq 0$$

$$G_p^+ = \{q_n\}, n \leq 0$$

The index n takes relative integer values, and the numerical values of the probability classes $q_n$ are defined recurrently as follows:

$$(q_n)_{n \in \mathbb{Z}} = \begin{cases} \frac{1}{2} & \text{if } n = 0 \\ \frac{1}{2} + \epsilon & \text{if } n = 1 \\ \frac{1}{2} - \epsilon & \text{if } n = -1 \\ F(q_{n-1}, q_1) & \text{if } n > 1 \\ F(q_{n-1}, q_{-1}) & \text{if } n < -1 \end{cases}$$

$\in$ is therefore a predetermined parameter of the filter IBBF. Its value is a constant between 0 and 0.5.

The fusion $F(q_n, q_m)$ between two probability classes $q_m$, $q_n$ is computed by applying the following equation: $F(q_n, q_m) = q_{m+n}$ The last parameter of the filter IBFF is F, which is the subset of Z for defining $(q_n)_{n \in \Gamma}$.

For example, if the probability indices are computed on eight bits, $\Gamma = \{-128, \ldots, 127\}$. Storing the probability indices on eight bits makes it possible to work with a particularly compact memory.

The result of fusing two elements of the sequence $q_n$ may be computed by a simple sum of the indices of the input elements.

The prediction step consists in consulting, in a lookup table, the index $n(d_{t,i}^A|z_{1:t-1})$ corresponding to the probability $P(d_{t,i}^A|z_{1:t-1})$ of the cell A taking the direction i in iteration t, knowing the set of all of the measurements $z_{1:t-1}$ before iteration t.

An initialization function of the filter is first invoked in order to precompute the lookup table. The filter is initialized once and for all, before the movement estimate.

The initialization function of the filter has four input values: the parameter $\in$ defined above, $\Gamma$ (the subset of Z for defining $(q_n)_{n\in\Gamma}$), and also the parameters $\alpha$ and $\beta$, which correspond respectively to the probability of keeping the same direction between two successive iterations and to the probability of changing direction between two successive iterations.

The lookup table predLUT is therefore a dual-entry table, one column for n and one column for the corresponding value in the table. The number of rows is equal to the size of the subset F. The lookup table is initially empty.

For each value n ($n \in \Gamma$), probabilities $q_n$ are computed recurrently using the formula defined above, using the parameter E and the fusion $F(q_n, q_m)$.

Next, predLUT[n] is given the value of approx_policy $(q_n \cdot \alpha + (1-q_n) \cdot \beta)$.

The function approx_policy is such that each entry in the lookup table is approximated in order to correspond to an element of $(q_n)_{n \in Z}$ $$\text{predLUT}(n) = m \text{ and approx\_policy}(q_n \cdot \alpha + (1-q_n) \cdot \beta) = q_m$$

Once the filter has been initialized, the function predLUT is applied to the propagated index $n(d_{t-1,i}^A|z_{1:t-1})$ thereby making it possible to obtain the prediction term of the filter IBBF $n(d_{t,i}^A|z_{1:t-1})$ only by consulting the table, without computations.

The step of updating the measurement filter consists in performing the following operation:

$$n(d_{t,i}^A|z_{1:t}) \leftarrow n(d_{t,i}^A|z_{1:t-1}) + n(d_{t,i}^A|z_t)$$

This therefore gives, at the end of each iteration, for each cell of the grid and for each direction i, the index $n(d_{t,i}^A|z_{1:t})$, which corresponds to the probability of the material body moving in the direction i.

An integer binary Bayesian filter is also applied in each iteration in order to estimate speed, as illustrated in FIG. 5.

The steps of the filtering are the same as for the direction estimate, with the difference that the indices are filtered, in each iteration, for each direction of the direction mask, and for each speed of the speed mask.

Thus, rather than manipulating a filtered movement grid for the direction $FMG_t^d$, which is a 2D table of dimensions $N_c \times N_d$ ($N_c$ number of cells of the grid, $N_d$ number of directions of the mask), what is manipulated, for the speeds, is a filtered movement grid for the speed $FMG_t^s$, which is a 3D table of dimensions $N_c \times N_d \times N_s$ number of speeds of the mask).

Each element $FMG_t^s(A,i,j)$ of the filtered movement grid for the speed $FMG_t^s$ stores an index $n(s_{t,i}^A|z_{1:t})$ of the posterior probability $P(s_{t,i}^A|z_{1:t})$ of cell A having moved from the direction i at the speed j in iteration t.

Thus, to compute the filtering of the displacement at each speed, a person skilled in the art may easily transpose the steps of predicting and updating the filter IBBF with regard to the speed data.

The method has been described taking into consideration two movement components characterizing the movement of a mobile body, specifically a direction component and a speed component.

Figures 11, 12:
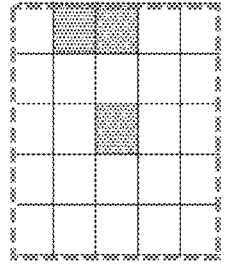
FIG. 11 shows a variant of FIGS. 6A and 6B, in which a mask comprising twenty-four zones is used, making it possible to jointly use direction movement components and speed movement components (for one and the same direction)
FIG. 12 illustrates the case in which a subset of the mask is considered.

According to a second embodiment, the method may be implemented considering only one movement component, as illustrated by FIG. 11.

In this case, the movement component corresponds to a direction between two cells of the grid of cells, with multiple distances per direction (which is in fact tantamount to considering multiple displacement speeds per direction, given the change in distance in each iteration).

The space around cell A is discretized into a plurality of directions (zones 1, 4, 7, 13, 22, 23 and 24) corresponding to a first direction movement component. Each direction moreover has multiple "depth" levels in the mask, corresponding to various speeds, which are themselves also discretized. For example, zone 4 has three depth levels, corresponding to three different speeds: zone 4 itself, zone 5 and zone 6.

The computations for estimating the movement of material bodies with a single mask comprising multiple zones per direction (in order to discretize multiple speeds per direction) are performed in a manner similar to the first embodiment.

In this case too, each displacement is a random binary variable, estimated by an instance of the binary Bayesian filter.

Using just one mask instead of two removes a data structure, thereby making it possible to save computing time, without otherwise losing accuracy in the movement estimate. By way of illustration, in the example of FIG. 11, there would be twenty-four filters to be updated in each iteration. With the first embodiment, there would be 8 filters to be updated for the directions, and 24 filters to be updated for the speeds (3 possible speeds per direction), therefore thirty-two filters to be updated in each iteration.

The method according to the invention does not necessarily involve taking into account all of the components around each cell. As illustrated in FIG. 12, there may be a focus only on certain components (for example two components located in the right-hand column). This also simplifies the updating of the filters. This implementation may be contemplated in situations in which the displacements of mobile bodies are constrained in certain directions and/or at certain speeds, for example on a conveyor belt in an industrial site.

According to one advantageous embodiment, the method furthermore comprises, following step a) of obtaining an inconsistency grid, and step b) of recurrently generating a filtered movement grid in iteration t, a step c) of determining, for each cell of the grid of cells, the movement component corresponding to a posterior probability greater than a predefined threshold (for example 0.8).

The movement component corresponding to the posterior probability greater than a threshold is determined using the filtered movement grid, illustrated by FIG. 7.

For each cell, the immediately adjacent cells are considered. If an immediately adjacent cell has the same movement component corresponding to the posterior probability greater than a threshold, the two adjacent cells are clustered, and so on, for as long as adjacent cells having the same movement component corresponding to the posterior probability greater than a threshold are identified.

Clustering of cells is thus performed (step d)).

If the movement components of a cell all have a zero posterior probability value, the cell is not taken into consideration, at the time t under consideration, for the clustering step.

Step e) then comprises determining a material body on the basis of the result of clustering step d). In one embodiment applied to the motor vehicle sector, it may for example be determined whether the material body is a pedestrian or a two-wheeled or four-wheeled motorized vehicle.

An object tracking module is supplied with the data from the tracking step of determining a material body (step f).

The clustering benefits from the structure of the filtered movement grid, which is a regular structure, thereby facilitating real-time computations in processors smaller than those used in the prior art.

By virtue of the method according to the invention, the movement estimate may be performed in microprocessors, for example with ARM (registered trademark) architectures, whereas, in the prior art, the estimate consumes a very large amount of computing resources and usually requires graphics processors (or GPU for graphics processing units).

The method according to the invention may be implemented by at least one distance sensor, for example a lidar, a radar or else a sonar, or by a camera able to extract distance information from a scene acquired by the sensor.

The feature grids are established on the basis of the distance measurements performed by the sensor.

If the sensor is capable of generating event image data in response to detecting a change in a scene that is located within its field of view, these data are transmitted to the data processor in order to characterize the movement dynamics of the material body.

The sensor may be housed on board the vehicle; as an alternative, the scene may be acquired by the sensor, and then the information for estimating the movement of the material body located in the scene may be transmitted to the mobile body. The sensor may thus be positioned at a fixed location, for example in a signpost, and communicate with vehicles nearby in order to actuate avoidance commands.

The vehicle may be autonomous or else not autonomous, and in this case the method according to the invention makes it possible to assist the driver with obstacle detection.

The mobile body may also be any device able to move autonomously, for example a domestic appliance such as an autonomous vacuum cleaner, or else a gardening appliance such as an autonomous lawnmower.

The mobile body also comprises actuators able to correct the trajectory of the autonomous mobile body on the basis of the estimate of the movement of the material body that has been performed using the method according to the invention with a view to avoiding the material body.

The estimation device may also be installed at a fixed position, in an intrusion detection sensor. The use of an event camera is particularly suitable for intrusion detection (the scene to be observed is generally fixed, except for in the event of intrusion).

The invention has essentially been described by discretizing the set of probabilities into a finite-cardinality set, in order not to have to perform computations using floating-point arithmetic operations. This provision makes it possible in particular to implement the method according to the invention in an on-board system having high integration constraints.

The method according to the invention could also use floating point arithmetic operations, in particular if the computational capabilities of the device implementing the method make it possible to perform the movement estimate in real time.

The invention claimed is:

1. An iterative method, implemented by a computer or by a dedicated electronic circuit, for estimating a movement of at least one material body in a surrounding space of an autonomous device, said surrounding space being discretized into a grid of cells, wherein, for each given iteration t, the following steps are implemented:
    a) obtaining an inconsistency grid in iteration t, generated in response to detection of a change of occupancy state in at least one of the cells of the grid of cells between an iteration t-1 and iteration t, each cell of the grid of cells and each cell of the inconsistency grid having a binary value,
    b) recurrently generating a filtered movement grid in iteration t comprising, for each cell of the grid of cells, a posterior probability of the material body having performed a movement with at least one movement component characterizing said movement, said movement component forming part of a discrete set of movement components, said filtered movement grid in iteration t being generated using the filtered movement grid in iteration t-1, an inconsistency grid from iteration t-1, and the inconsistency grid in iteration t,
    wherein step b) comprises applying a binary Bayesian filter, each movement component of the discrete set of components being an independent binary random variable estimated by said binary Bayesian filter, the posterior probability corresponding to an output of said binary Bayesian filter, and
    wherein navigation of said autonomous device being controlled based on said filtered movement grid.

2. The method according to claim 1, wherein step a) comprises generating a feature grid in iteration t, each cell having a first Boolean value corresponding to a predetermined first occupancy state, or having a second Boolean value different from the first Boolean value if not, the inconsistency grid in iteration t being generated on a basis of the change of Boolean value of each cell between the feature grid in iteration t and a feature grid generated in an iteration t-1.

3. The method according to claim 2, further comprising preliminary steps that comprise:
    a1) acquiring a plurality of distance measurements for said material bodies from one or more sensors;
    a2) applying an inverse model of the corresponding sensor to the grid of cells in each distance measurement in order to determine a probability of occupancy by a material body for a set of cells of said grid of cells, said inverse model corresponding to the set of probabilities of occupancy of a cell for a given measurement; and
    a3) constructing the feature grid on a basis of occupancy probabilities estimated in step a2).

4. The method according to claim 3, wherein, in step b), a propagated index is computed for each element of the filtered movement grid in iteration t on a basis of indices of the filtered movement grid computed in a previous iteration t-1, using the following relationship: $n(d_{t-1,i}^{A}|z_{1:t-1}) = \max (FMG_{t-1}^{d}(A',i))$
    for each cell A' preceding cell A in a direction i at a time t-1;
    wherein $n(d_{t-1,i}^{A}|z_{1:t-1})$ corresponds to the propagated index, and $(FMG_{t-1}^{d}(A',i))$ corresponds to the filtered movement grid and then a binary Bayesian filter is applied whose inputs are the propagated index, a probability index of the inverse sensor model that corresponds to the probability of a cell A following the movement component i in iteration t, knowing only a sensor measurement $z_t$ produced in the same iteration, a probability of the movement component of the material body not varying between iterations t-1 and t, and a probability of the movement component of the material body varying between iterations t-1 and t.

5. The method according to claim 4, wherein the index corresponding to a prediction component of the binary Bayesian filter for the movement component estimate is obtained using a lookup table comprising a finite set of probability indices, and the filtered index is obtained by adding integer probability indices.

6. The method according to claim 4, wherein the probability of retaining the same movement component between iterations t-1 and t and the probability of changing movement component between iterations t-1 and t are parameters that are constant as a function of time.

7. The method according to claim 1, wherein the posterior probability which corresponds to the output of the binary Bayesian filter is approximated by a value belonging to a finite-cardinality set according to an approximation policy, said approximation policy being a function that approximates the value of a probability by an index among a predefined set of indices.

8. The method according to claim 7, wherein:
$n(d_{t,i}^A|z_t) = \eta_d > 0$ if, in the inconsistency grid from iteration t-1 and in the inconsistency grid in iteration t, a change of Boolean value was measured in the movement component i with respect to cell A, where $\eta_d$ is an integer constant;
$n(d_{t,i}^A|z_t) = 0$ if not,
wherein $n(d_{t,i}^A|z_t)$ corresponds to a probability index of an inverse sensor model that corresponds to the probability of a cell A following the movement component i in iteration t, knowing only the sensor measurement $z_t$ produced in the same iteration.

9. The method according to claim 7, wherein said finite-cardinality set of probability classes is formed by combining one or more subsets such that, in step a3), fusing two probability classes belonging to one and the same subset provides a result also belonging to said subset.

10. The method according to claim 9, wherein the finite-cardinality set of probability classes, denoted by $G_p$, is formed by combining two subsets $G_p^-$ and $G_p^+$ defined by:
$G_p^- = \{(q_n), n \leq 0\}$, $G_p^+ = \{(q_n), n \geq 0\}$
the index n taking relative integer values, and numerical values of probability classes $q_n$ being defined recurrently as follows:

$$(q_n)_{n \in \mathbb{Z}} = \begin{cases} \frac{1}{2} & \text{if } n = 0 \\ \frac{1}{2} + \epsilon & \text{if } n = 1 \\ \frac{1}{2} - \epsilon & \text{if } n = -1 \\ F(q_{n-1}, q_1) & \text{if } n > 1 \\ F(q_{n-1}, q_{-1}) & \text{if } n < -1 \end{cases}$$

where $\in$ is a predetermined value
and wherein, in said step a3), a Bayesian fusion F between two probability classes is computed by summing the indexes of input elements.

11. The method according to claim 1, wherein the movement component corresponds to a direction between two cells of the grid of cells, or to a displacement speed from one cell to another in a given direction.

12. The method according to claim 1, furthermore comprising the following steps:
c) determining, for each cell of the grid of cells, the movement component corresponding to a posterior probability greater than a threshold;
d) clustering adjacent cells having the same movement component corresponding to the posterior probability greater than a threshold;
e) determining the material body on a basis of a result of the clustering step;
f) tracking the material body.

13. A method for avoiding a material body moving around an autonomous device, implementing an iterative method for estimating a movement of the material body, and in that it sends a command to an actuator of the autonomous device in order to avoid said material body,
wherein said iterative method for estimating the movement of said material body in a surrounding space of an autonomous device, said surrounding space being discretized into a grid of cells, comprises the following steps for each given iteration t:
a) obtaining an inconsistency grid in iteration t, generated in response to detection of a change of occupancy state in at least one of the cells of the grid of cells between an iteration t-1 and iteration t, each cell of the grid of cells and each cell of the inconsistency grid having a binary value, and
b) recurrently generating a filtered movement grid in iteration t) comprising, for each cell of the grid of cells, a posterior probability of the material body having performed a movement with at least one movement component characterizing said movement, said movement component forming part of a discrete set of movement components, said filtered movement grid in iteration t) being generated using the filtered movement grid in iteration t-1, an inconsistency grid from iteration t-1, and the inconsistency grid in iteration t,
wherein step b) comprises applying a binary Bayesian filter, each movement component of the discrete set of components being an independent binary random variable estimated by said binary Bayesian filter, the posterior probability corresponding to an output of said binary Bayesian filter, and
wherein navigation of said autonomous device being controlled based on said filtered movement grid.

14. A device for estimating a movement of a material body in a space surrounding an autonomous device, comprising:
at least one input port, and
a data processor configured to receive signals at an input, to generate a feature grid on a basis of said signals, and to characterize dynamics of the material body by applying an iterative method for estimating the movement of said material body in a surrounding space of an autonomous device, said surrounding space being discretized into a grid of cells, said data processor being configured for implementing the following steps for each given iteration t:
a) obtaining an inconsistency grid in iteration t, generated in response to detection of a change of occupancy state in at least one of the cells of the grid of cells between an iteration t-1 and iteration t, each cell of the grid of cells and each cell of the inconsistency grid having a binary value, and b) recurrently generating a filtered movement grid in iteration t) comprising, for each cell of the grid of cells, a posterior probability of the material body having performed a movement with at least one movement component characterizing said movement, said movement component forming part of a discrete set of movement components, said filtered movement grid in iteration t) being generated using the filtered movement grid in iteration t-1, an inconsistency grid from iteration t-1, and the inconsistency grid in iteration t, wherein step b) comprises applying a binary Bayesian filter, each movement component of the discrete set of components being an independent binary random variable estimated by said binary Bayesian filter, the posterior probability corresponding to an output of said binary Bayesian filter, and wherein navigation of said autonomous device being controlled based on said filtered movement grid.

15. The device for estimating the movement of a material body in a space surrounding a mobile body according to claim 14, wherein said at least one input port is configured for receiving a plurality of signals representative of a time series of distance measurements from one or more distance sensors.

16. The device for estimating the movement of a material body in a space surrounding a mobile body according to claim 14, wherein said at least one input port is configured for receiving a time series of feature grids from one or more event cameras.

17. An autonomous device, comprising a device for estimating a movement of a material body in a space surrounding an autonomous device, said device for estimating the movement of a material body comprising:

at least one input port, and a data processor configured to receive signals at an input, to generate a feature grid on a basis of said signals, and to characterize dynamics of the material body by applying an iterative method for estimating the movement of said material body in a surrounding space of an autonomous device, said surrounding space being discretized into a grid of cells, said data processor being configured for implementing the following steps for each given iteration t:

a) obtaining an inconsistency grid in iteration t, generated in response to detection of a change of occupancy state in at least one of the cells of the grid of cells between an iteration t-1 and iteration t, each cell of the grid of cells and each cell of the inconsistency grid having a binary value, and b) recurrently generating a filtered movement grid in iteration t) comprising, for each cell of the grid of cells, a posterior probability of the material body having performed a movement with at least one movement component characterizing said movement, said movement component forming part of a discrete set of movement components, said filtered movement grid in iteration t) being generated using the filtered movement grid in iteration t-1, an inconsistency grid from iteration t-1, and the inconsistency grid in iteration t, wherein step b) comprises applying a binary Bayesian filter, each movement component of the discrete set of components being an independent binary random variable estimated by said binary Bayesian filter, the posterior probability corresponding to an output of said binary Bayesian filter, and wherein navigation of said autonomous device being controlled based on said filtered movement grid.

* * * * *